(12) United States Patent
Hayashi

(10) Patent No.: US 12,179,365 B2
(45) Date of Patent: Dec. 31, 2024

(54) ROBOT SYSTEM, TERMINAL, CONTROL METHOD FOR ROBOT SYSTEM, AND CONTROL METHOD FOR TERMINAL

(71) Applicant: CANON KABUSHIKI KAISHA, Tokyo (JP)

(72) Inventor: Tadashi Hayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 299 days.

(21) Appl. No.: 17/684,185

(22) Filed: Mar. 1, 2022

(65) Prior Publication Data

US 2022/0281109 A1 Sep. 8, 2022

(30) Foreign Application Priority Data

Mar. 8, 2021 (JP) ................. 2021-036299

(51) Int. Cl.
*B25J 9/16* (2006.01)
*B25J 11/00* (2006.01)

(52) U.S. Cl.
CPC ............. *B25J 9/1664* (2013.01); *B25J 9/161* (2013.01); *B25J 9/163* (2013.01); *B25J 9/1653* (2013.01); *B25J 9/1669* (2013.01); *B25J 9/1674* (2013.01); *B25J 11/0005* (2013.01)

(58) Field of Classification Search
CPC . B25J 9/1664; B25J 9/161; B25J 9/163; B25J 9/1653; B25J 9/1669; B25J 9/1674; B25J 11/0005
See application file for complete search history.

(56) References Cited

U.S. PATENT DOCUMENTS

| | | | |
|---|---|---|---|
| 9,902,061 B1* | 2/2018 | Kuffner | B25J 9/163 |
| 2014/0135984 A1* | 5/2014 | Hirata | B25J 19/06 700/255 |
| 2014/0223548 A1* | 8/2014 | Wassingbo | H04N 21/25875 726/19 |
| 2015/0352719 A1* | 12/2015 | Nakazato | G05B 19/4183 700/253 |
| 2017/0144297 A1* | 5/2017 | Takaichi | B25J 9/0096 |
| 2017/0355079 A1* | 12/2017 | Takahashi | B25J 9/1676 |
| 2019/0160671 A1* | 5/2019 | Kurihara | B25J 13/06 |
| 2020/0001459 A1 | 1/2020 | Song | |
| 2020/0368909 A1* | 11/2020 | Sejimo | B25J 9/1669 |
| 2021/0154829 A1* | 5/2021 | Holmes | B25J 9/1664 |
| 2021/0173377 A1* | 6/2021 | Laftchiev | B25J 9/1674 |
| 2022/0032454 A1* | 2/2022 | Yang | G06V 10/764 |
| 2022/0130625 A1* | 4/2022 | Fukui | H01H 3/022 |

(Continued)

FOREIGN PATENT DOCUMENTS

| | | |
|---|---|---|
| JP | H05189443 A | 7/1993 |
| JP | 2001088069 A | 4/2001 |
| JP | 2006285625 A | 10/2006 |

(Continued)

*Primary Examiner* — Jaime Figueroa
*Assistant Examiner* — Mohamad O El Sayah
(74) *Attorney, Agent, or Firm* — Canon U.S.A., Inc., IP Division

(57) ABSTRACT

A robot system is provided and includes a robot body that performs predetermined work together with a user, and a control device that controls the robot body. The control device selects, in accordance with special information of the user, an action to be performed by the robot body during the predetermined work.

21 Claims, 13 Drawing Sheets

(56) References Cited

U.S. PATENT DOCUMENTS

| | | | | |
|---|---|---|---|---|
| 2022/0390927 A1* | 12/2022 | Yamashita | ............. | G06Q 50/04 |
| 2023/0334745 A1* | 10/2023 | Azhar | .................... | G06T 13/80 |

FOREIGN PATENT DOCUMENTS

| | | | |
|---|---|---|---|
| JP | 2007216381 | A | 8/2007 |
| JP | 2015230621 | A | 12/2015 |
| JP | 2017136350 | A | 8/2017 |
| JP | 2018062016 | A | 4/2018 |
| WO | 2009004772 | A1 | 1/2009 |

\* cited by examiner

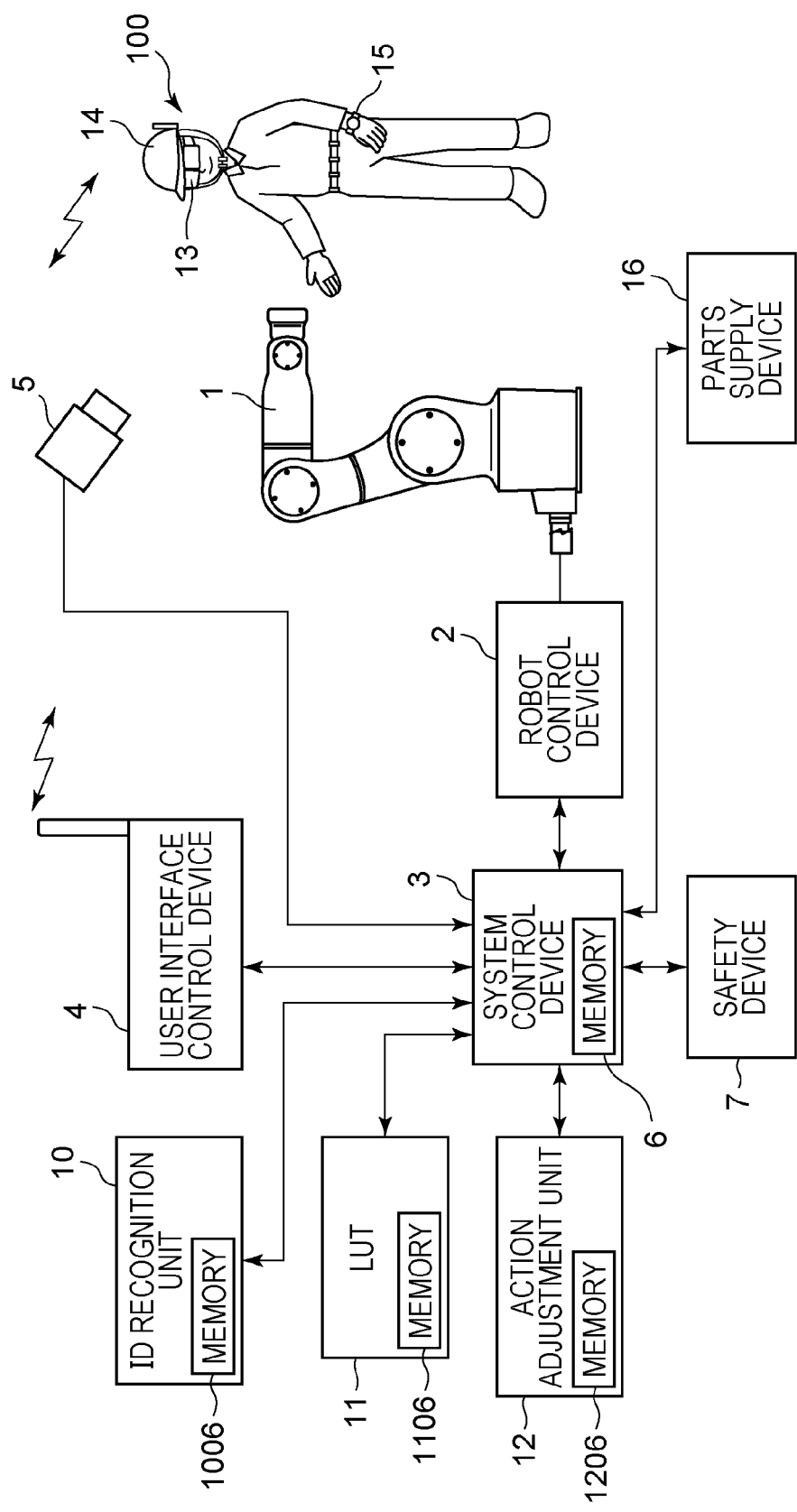

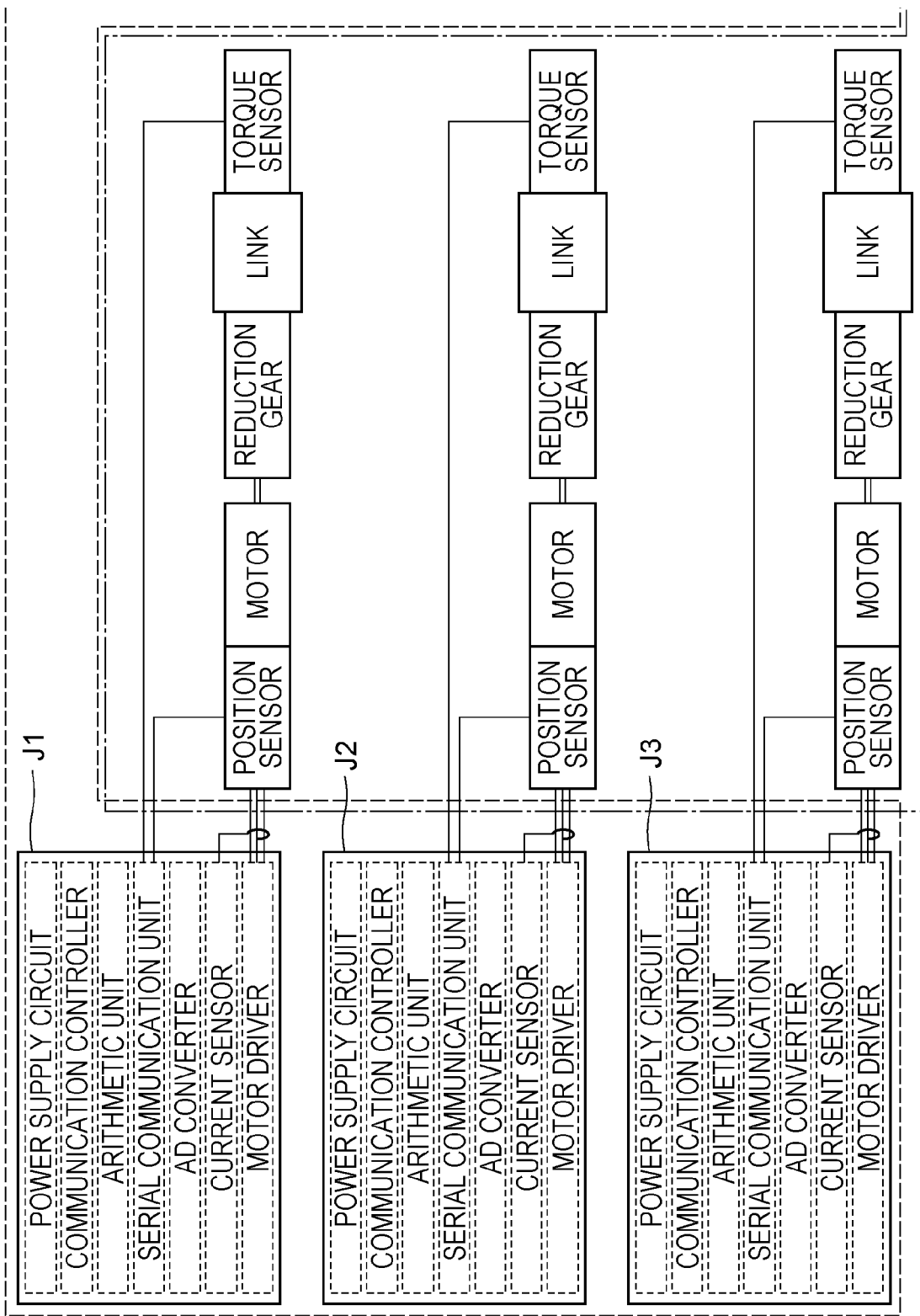

ROBOT SYSTEM, TERMINAL, CONTROL METHOD FOR ROBOT SYSTEM, AND CONTROL METHOD FOR TERMINAL

BACKGROUND

Field

The present disclosure relates to a robot system, a terminal, a head mounted display, a helmet, a wristwatch terminal, a teaching pendant, a control method for a robot system, a control method for a terminal, a method of manufacturing a product using the robot system, and a recording medium.

Description of the Related Art

In recent years, in industrial robots used in factories and others, collaborative robots capable of collaborating with humans are being developed. For example, Japanese Patent Laid-Open No. 2018-62016 discloses a control device for a robot through which a human and the robot work in collaboration with each other, and the control device learns the motion of the human in a time period during which the human and the robot are working in collaboration with each other to control the motion of the robot. This causes the robot to operate in response to the motion of the human and enables an improvement in work efficiency through collaboration between the human and the robot.

SUMMARY

According to the present disclosure, a robot system is provided that includes a robot body configured to perform predetermined work together with a user, and a control device configured to control the robot body. The control device selects, in accordance with special information of the user, an action to be performed by the robot body during the predetermined work.

Further features will become apparent from the following description of exemplary embodiments with reference to the attached drawings.

BRIEF DESCRIPTION OF THE DRAWINGS

FIG. 1 is a schematic diagram of a robot system in an embodiment.

FIGS. 2A and 2B illustrate a control block diagram of a robot control device in the embodiment.

DESCRIPTION OF THE EMBODIMENTS

Figure 2B:
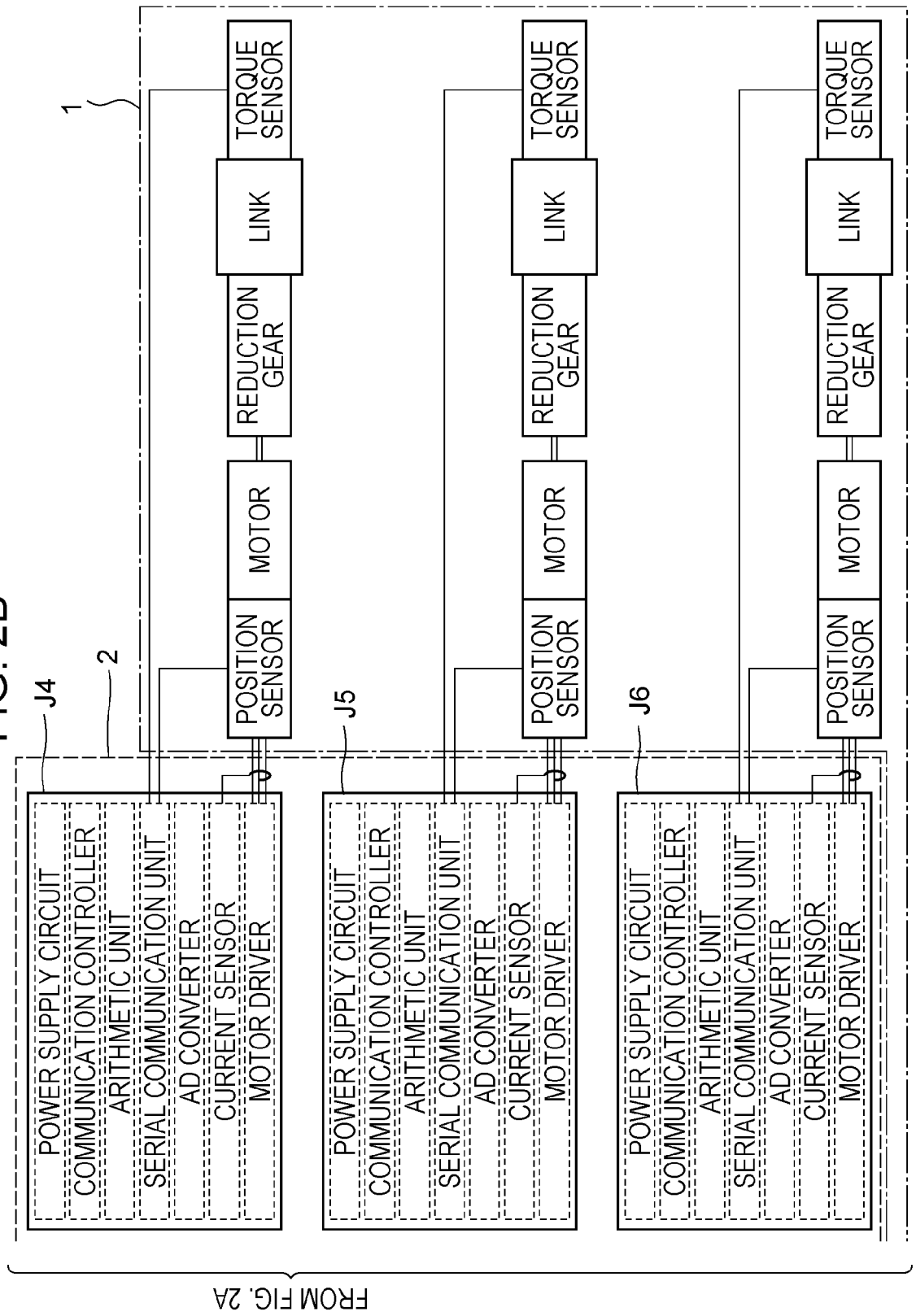

A worker (or user), who is a human being, gets fatigued, and thus it is difficult for the worker to perform long hours of work continuously. For this reason, a plurality of workers perform work one after another. In this manner of working, unlike machines that are built with a given degree of accuracy and are coordinated with each other, procedures by which humans can efficiently work vary according to individual attributes (special information), such as height or a dominant hand, for example. Thus, in the technique using learning of the motion of a human as disclosed in Japanese Patent Laid-Open No. 2018-62016, robot control that improves work efficiency in consideration of the individual attributes described above is not performed.

The present disclosure provides a device that can improve work efficiency in consideration of attributes (special information) of a worker (or user).

Embodiments for implementing the present disclosure will be described in detail below with reference to the accompanying drawings.

Exemplary embodiments to be described below are merely examples. For example, configurations of the details can be changed without departing from the gist of the present disclosure. Furthermore, numerical values to be discussed in each embodiment are values for reference and are not intended to limit the present disclosure.

First Embodiment

FIG. 1 is a block diagram schematically illustrating a control system of a robot system 1000 in this embodiment. In FIG. 1, the robot system 1000 includes a robot body 1, a robot control device 2 that performs drive control of the robot body 1, and a vision sensor 5 that monitors the operational status of the robot body 1. Although FIG. 1 illustrates one vision sensor 5, a plurality of vision sensors 5 may be provided, and the vision sensor 5 may be installed in the robot body 1 as necessary. The robot body 1 includes an end effector serving as a particular part capable of holding or grasping a workpiece and can perform collaborative work (predetermined work), such as transfer (or receipt) of a workpiece, together with a worker (or user) 100.

Furthermore, a system control device 3 manages a sequence of actions of the robot body 1 and includes a memory 6 storing action details of the robot body 1. A safety device 7 is an emergency stop switch or the like and outputs a command to bring the robot body 1 to an emergency stop when the worker 100 may be endangered by the robot body 1, for example. A user interface control device 4 is a control device that deals with an input from a user interface worn on the worker 100 who performs collaborative work together with the robot body 1.

A parts supply device 16 is a device that supplies a workpiece to the robot body 1. A workpiece is manipulated by the robot body 1 to be assembled to another workpiece, and thus industrial goods or products can be manufactured. As manipulations performed on this workpiece, for example, manipulations of grasping or holding the workpiece as a target object by using a robot arm, moving the workpiece, and fitting or assembling the workpiece to another workpiece are performed. A product assembled by the robot body 1 is transferred to the worker 100. In this embodiment, although the example where a product is manufactured by the robot body 1 assembling workpieces is described, the manufacture is not limited to this. For example, a tool, such as a cutting tool or abrasive tool, can be provided in the robot body 1 to manufacture a product by processing a workpiece.

Furthermore, there are provided an ID recognition unit 10, a look up table (LUT) 11, and an action adjustment unit 12 that are used when the system control device 3 manages the sequence of actions. Furthermore, the worker 100 wears, as user interfaces, a head mounted display 13, a helmet 14, and a wristwatch terminal 15. The head mounted display 13, the helmet 14, and the wristwatch terminal 15 according to the present disclosure include a wireless communication device to enable the exchange of information with the user interface control device 4.

FIGS. 2A and 2B illustrate a control block diagram illustrating the robot body 1 and a detailed control system of the robot control device 2. The robot body 1 has a plurality of joints (six axes of joints J1 to J6) and includes a motor that drives a joint, a position sensor that detects the position of a rotation axis of the motor, a reduction gear that reduces the rotation speed of the motor to cause a link to act, and a torque sensor that measures, as torque, force acting on the link.

The robot control device 2 includes, as basic components, a power supply circuit, a communication controller, an arithmetic unit, a serial communication unit, an analog-to-digital (AD) converter, a current sensor, and a motor driver for each of the joints J1 to J6. Each joint is subjected to drive control by a motor drive signal from the motor driver of the robot control device 2. In this embodiment, although the motor driver that generates power for driving the motor is built in the robot body 1, the robot control device 2 may be installed outside the robot body 1 so that motor drivers for the respective axes are collectively provided outside the robot body 1. Each of arithmetic units of the robot control device 2 is programmed to control the robot body 1 so that, when the torque sensor of each axis detects excessively high torque, the force is relieved. Furthermore, a current generated by the motor driver so that a human and the robot perform collaborative work is controlled by the current sensor.

Furthermore, an output of the position sensor and an output of the torque sensor are converted to a sensor communication format for communication between the robot body 1 and the robot control device 2 and are input to the robot control device 2 by the serial communication unit for each axis. In this embodiment, the sensor communication format may be any other type of sensor communication format that can achieve a predetermined communication rate.

Furthermore, communication controllers for the respective axes are connected in such a manner as to be able to perform transmission and reception of data and are provided in such a manner as to be able to communicate with the system control device 3. This enables the exchange of a motor drive signal and an output of each sensor between the arithmetic unit for each axis and the system control device 3.

Figure 3:
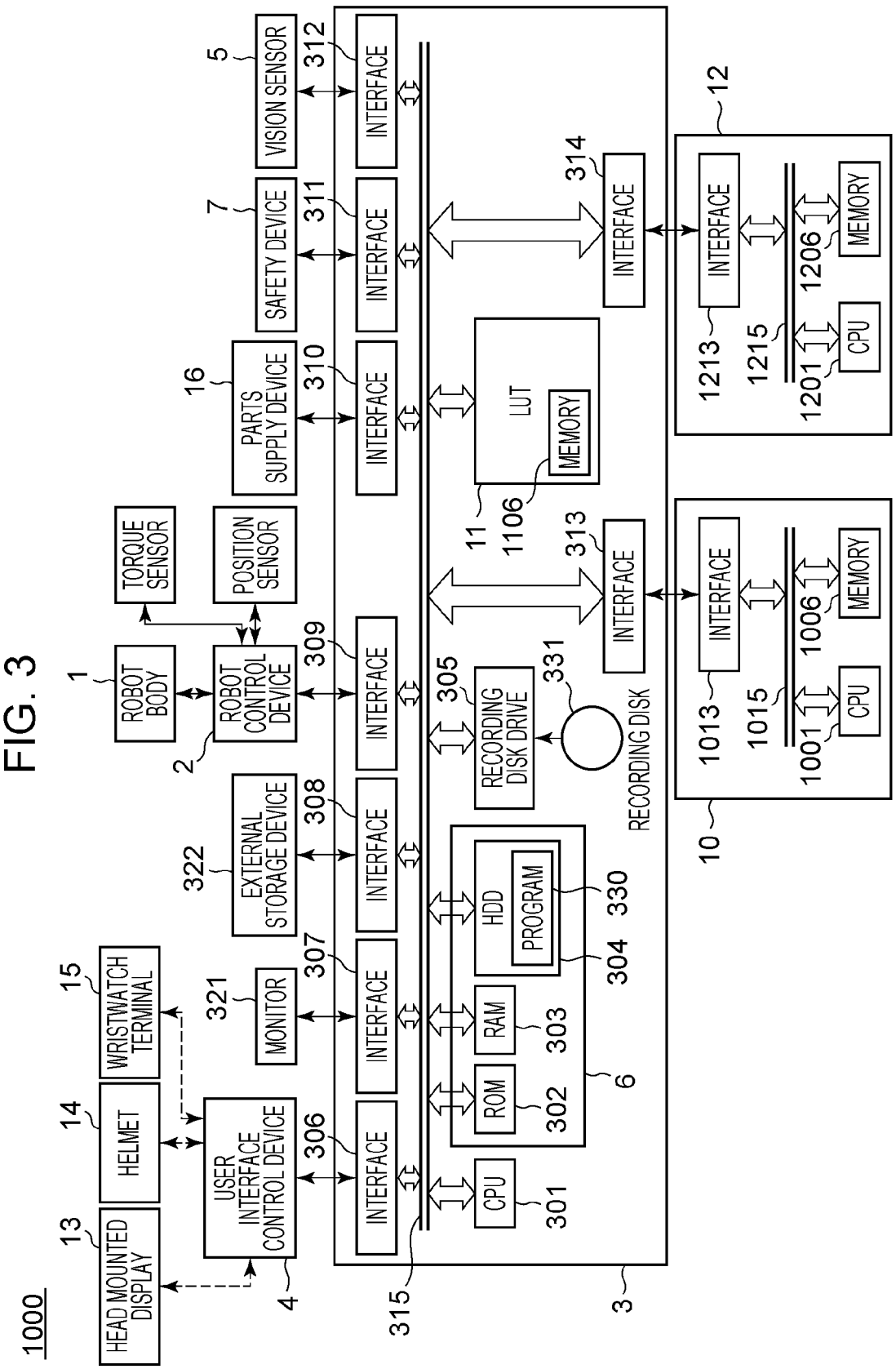
FIG. 3 is a control block diagram of the robot system in the embodiment.

FIG. 3 is a block diagram illustrating a configuration of the control system of the robot system 1000 in this embodiment. The system control device 3 is constituted by a computer and includes a central processing unit (CPU) 301 serving as a control unit (processing unit).

Furthermore, the system control device 3 includes, as the memory 6, a read only memory (ROM) 302, a random access memory (RAM) 303, and a hard disk drive (HDD) 304. Additionally, the system control device 3 includes a recording disk drive 305, and various types of interfaces 306, 307, 308, 309, 310, 311, 312, 313, and 314 are connected to the system control device 3 via a bus 315.

The ROM 302, the RAM 303, the HDD 304, the recording disk drive 305, and the various types of interfaces 306 to 314 are connected to the CPU 301 via the bus 315. A basic program, such as a basic input/output system (BIOS), is stored in the ROM 302. The RAM 303 is a storage device that temporarily stores various pieces of data, such as arithmetic processing results of the CPU 301.

The HDD 304 is a storage device that stores, for example, arithmetic processing results of the CPU 301 or various pieces of data acquired from the outside world. The HDD 304 also records a program 330 for causing the CPU 301 to perform arithmetic processing. The CPU 301 performs, by using the program 330 recorded (stored) in the HDD 304, steps of a robot control method based on detection results of the torque sensor and the position sensor.

The recording disk drive 305 can read out, for example, various pieces of data or programs recorded on a recording disk 331.

Similarly, the user interface control device 4, the ID recognition unit 10, and the action adjustment unit 12 include, as an arithmetic unit, a CPU, and include, as a memory (storage unit), a RAM, a ROM, and an HDD.

The user interface control device 4 is connected to the interface 306. The CPU 301 receives an input of data from or outputs data to the user interface control device 4 via the interface 306 and the bus 315.

The user interface control device 4 is a control device that outputs work information to a worker and also receives an interrupt signal from the worker, such as a temporary interruption of work. In this embodiment, as user interface terminals, the head mounted display 13, the helmet 14, and the wristwatch terminal 15 are used. These terminals are connected to the user interface control device 4 through wireless communication, and the user interface control device 4 controls each terminal through wireless communication. In this embodiment, although wireless communication has been described as an example, wired communication may be used if the range of motion of the worker is relatively narrow.

The head mounted display 13 is a semitransparent display. The worker can receive work instructions displayed on the display while simultaneously observing the state of the robot through the head mounted display 13.

The helmet 14 works in conjunction with the safety device 7 for head protection and transmits information about the wearing of the helmet, such as a buckle, to the safety device 7 via the user interface control device 4, the interfaces 306 and 311, and the bus 315. When the buckle has been unfastened, the safety device 7 stops collaborative work of the robot body 1 and also transmits, to the system control device 3, a signal for causing each interface to display a warning.

The wristwatch terminal 15 includes a touch panel, and the worker can provide inputs through operations, such as that the worker touches the touch panel and slides a finger. In this embodiment, although the head mounted display 13, the helmet 14, and the wristwatch terminal 15 have been described as examples of a user interface, the user interface is not limited to these. For example, a PAD mobile terminal including an integrated input/output may be used. Furthermore, a stationary input/output terminal installed near a workspace may be used, or a teaching pendant through which, for example, robot teaching is performed can be used.

A monitor 321 is connected to the interface 307, and various images are displayed on the monitor 321 under control of the CPU 301. In such an image display, as a warning display provided by the above-described safety device 7, an image of a warning can be displayed on the monitor 321. The interface 308 is configured so that an external storage device 322 that is a storage unit, such as a rewritable nonvolatile memory or external HDD, can be connected to the interface 308.

The robot control device 2 is connected to the interface 309. The robot control device 2 outputs, as a control target value, an action command from the system control device 3 to the robot body 1 and performs drive control of the robot body 1 by using feedback from the torque sensor and the position sensor of each axis.

The CPU 301 acquires detection results from the position sensors of the respective joints J1 to J6 via the robot control device 2, the interface 309, and the bus 315. The CPU 301 outputs, to the robot control device 2 including the motor drivers for the respective axes, data of command values of the respective joints based on the detection results of the respective position sensors at predetermined time intervals via the bus 315 and the interface 309 and performs position control on the robot body 1.

Furthermore, the torque sensors provided in the respective joints J1 to J6 are connected to the CPU 301 via the interface 309 and the bus 315. The CPU 301 acquires a detection result from each torque sensor via the interface 309 and the bus 315. Thus, the CPU 301 outputs, to the robot control device 2 including the motor drivers for the respective axes, data of command values of the respective joints based on detection results of the torque sensors at predetermined time intervals via the bus 315 and the interface 309 and performs force control (torque control) on the robot body 1.

Furthermore, the CPU 301 is connected to the parts supply device 16 via the interface 310 and the bus 315. The parts supply device 16 includes a sensor (not illustrated) that detects that a workpiece has been set, and the CPU 301 instructs the parts supply device 16 to set a new workpiece in accordance with an output of this sensor.

Furthermore, the CPU 301 is connected to the vision sensor 5 via the interface 312 and the bus 315. The vision sensor 5 captures an image of the robot body 1 and the worker 100 and measures the image to thereby acquire the operational status of the robot body 1 and surrounding circumstances. Subsequently, the vision sensor 5 transmits the operational status and the surrounding circumstances to the CPU 301 via the interface 312 and the bus 315. The CPU 301 can control the robot body 1 by using the information transmitted from the vision sensor 5.

Furthermore, the CPU 301 is connected to the safety device 7 via the interface 311 and the bus 315 and has a function of stopping the robot body 1 safely when the CPU 301 receives a safety stop signal from the safety device 7. For example, the robot body 1 is brought to a stop at such a safe speed that the worker is not endangered even if the robot body 1 collides with the worker when the robot body 1 stops, and the robot body 1 is controlled so that excessive force does not act on the worker in the unlikely event that the robot body 1 comes into contact with the worker. Incidentally, when output of the robot body 1 during work is exceedingly small, force control described above can be omitted.

The CPU 301 generates, from action information recorded in the memory 6, action timing of work by using signal information from each sensor from the robot control device 2 and a signal of an external sensor (such as a sensor provided in the parts supply device 16) that is not illustrated. Furthermore, the CPU 301 monitors signal information from each sensor from the robot control device 2, information from the vision sensor 5, and a safety stop signal of the safety device 7 and maintains the worker 100 in a safe state. In particular, in collaborative work between the robot body 1 and the worker 100, the worker 100 and the robot body 1 come close to each other. For this reason, in this embodiment, a positional relationship between the worker 100 and the robot body 1 is monitored by the vision sensor 5, and the robot body 1 is brought to an emergency stop when a positional relationship that is unsafe is detected. Incidentally, this does not apply in the case where output of the robot body 1 is sufficiently small or in the case where the robot body 1 and the worker 100 are isolated from each other at all times during work.

The ID recognition unit 10 includes a CPU 1001, a memory 1006, and an interface 1013 that are provided in such a manner as to be able to communicate with each other via a bus 1015. Furthermore, the interface 313 and the interface 1013 are connected in such a manner as to be able to communicate with each other. This enables transmission and reception of data between the CPU 301 and the CPU 1001. A process performed by the ID recognition unit 10 will be described later.

The LUT 11 is a large-scale selector and is implemented with hard wired logic, such as a gate array, in the system control device 3. Furthermore, the LUT 11 is implemented in such a manner as to be able to communicate with a CPU of each control device via the bus 315. Furthermore, the LUT 11 includes a memory 1106 for storing various pieces of data. A process performed by the LUT 11 will be described later.

The action adjustment unit 12 includes a CPU 1201, a memory 1206, and an interface 1213 that are provided in such a manner as to be able to communicate with each other via a bus 1215.

Furthermore, the interface 314 and the interface 1213 are connected in such a manner as to be able to communicate with each other. This enables transmission and reception of data between the CPU 301 and the CPU 1201. Furthermore, information of the LUT 11 can be referred to. A process performed by the action adjustment unit 12 will be described later.

Incidentally, in this embodiment, a computer-readable recording medium refers to each HDD, and the case will be described where a program corresponding to each HDD is stored. However, the present disclosure is not to be limited to this. A program may be recorded on any other recording medium from which a computer can read. For example, as a recording medium for supplying a program, a ROM, a recording disk, an external storage device, or the like may be used. Specifically, examples of a recording medium that can be used include a flexible disk, a hard disk, an optical disc, a magnetic optical disk, a compact disc-ROM (CD-ROM), a compact disc-recordable (CD-R) disc, a magnetic tape, a nonvolatile memory, and a ROM.

Next, a processing procedure performed in the robot system 1000 in this embodiment will be described with reference to figures. Furthermore, the following flow is performed by CPUs of the respective control devices communicating with each other.

Figure 4:
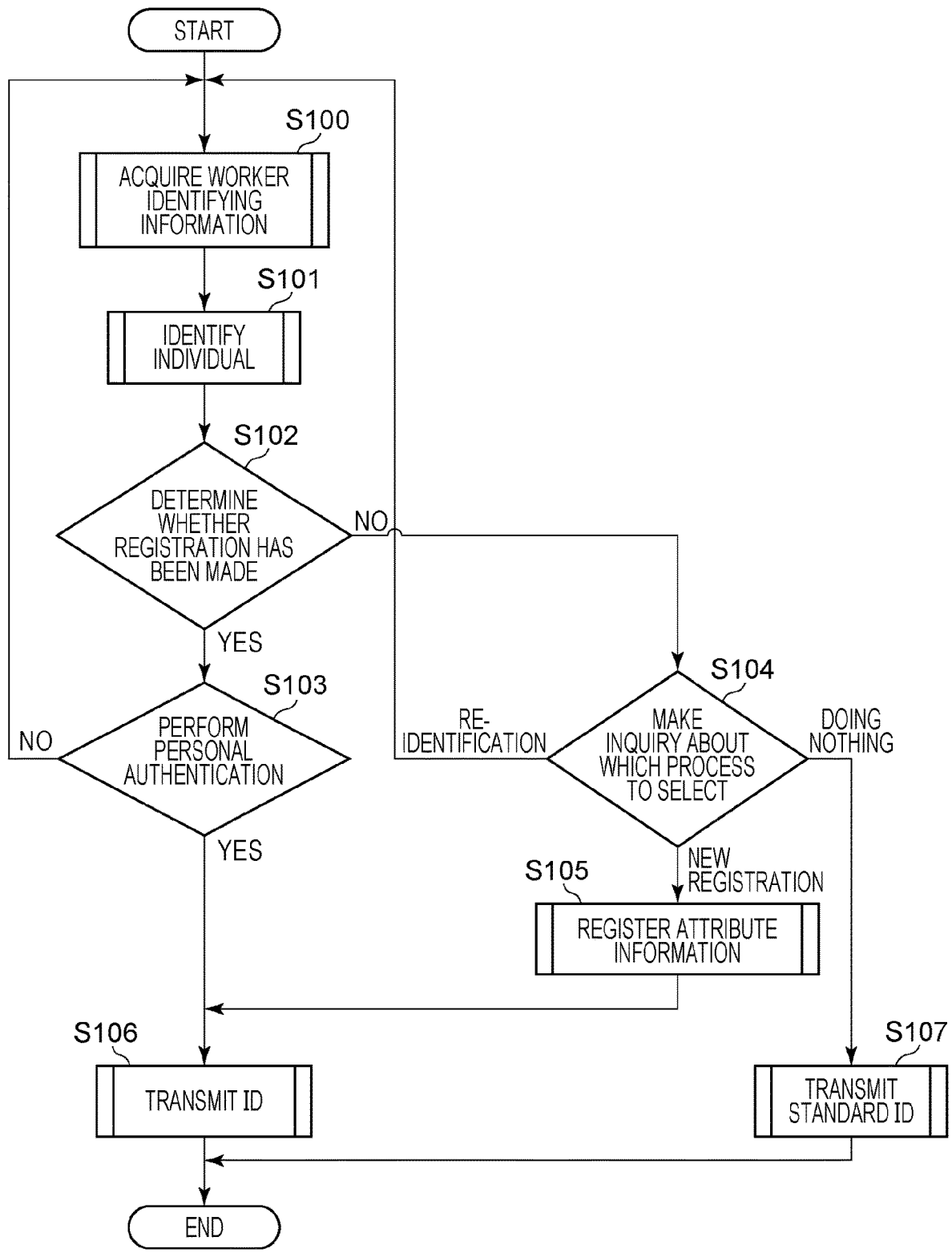
FIG. 4 is a control flowchart in the embodiment.

FIG. 4 is a control flowchart regarding acquisition of identifying information of the worker 100 in this embodiment, new registration of attribute information (special information), and personal authentication. The control flowchart is performed by the system control device 3, the user interface control device 4, and the ID recognition unit 10. Assume that, in the memory 1006 of the ID recognition unit 10, pieces of identifying information of a fixed number of workers are stored in association with corresponding IDs and corresponding pieces of attribute information.

Referring to FIG. 4, first, identifying information of the worker 100 is acquired in S100. Specifically, the system control device 3 acquires image information, such as face or gait information, provided by the vision sensor 5. Furthermore, the user interface control device 4 acquires at least one or more pieces of information of, for example, iris information of the worker 100 from a camera of the head mounted display 13, brain waves and blood flow patterns from the helmet 14, and blood flow patterns and fingerprint information from the wristwatch terminal 15. Acquisition of iris information, brain waves, blood flow patterns, fingerprint information, and the like is performed by using a related art that is publicly known, and a description thereof is omitted here. Furthermore, in this embodiment, although iris information, brain waves, blood flow patterns, fingerprint information, and the like are acquired by the respective user interfaces, iris information, brain waves, blood flow patterns, fingerprint information, and the like can be acquired by one user interface. Subsequently, the system control device 3 and the user interface control device 4 transmit the acquired pieces of information to the ID recognition unit 10.

In this embodiment, although the case has been described where the head mounted display 13, the helmet 14, and the wristwatch terminal 15 include a wireless communication device to enable the exchange of information with the user interface control device 4, the information exchange can be performed by wire, of course.

Next, in S101, the ID recognition unit 10 identifies the worker 100 present around the robot body 1 at present in accordance with the identifying information acquired in S100 and identifying information registered in the memory 1006. As a pattern identifying algorithm in identifying, there are various methods, such as deep learning. Any other method that can ensure accuracy may be used.

Next, in S102, the ID recognition unit 10 determines whether or not information of the worker 100 present around the robot body 1 at present has been registered in the memory 1006 in association with a corresponding ID or whether or not the worker 100 is a first-time worker without the information being registered.

When the answer to S102 is Yes and the acquired information has been registered, the flow proceeds to S103, and the ID recognition unit 10 informs, through a user interface, the worker 100 of a personal name stored in the memory 1006 in association with the ID of the information and performs authentication of the worker 100. Through a confirmation operation performed by the worker 100, when the information associated with the ID coincides with the information of the worker 100, the flow proceeds to S106 in accordance with Yes in S103. Through a confirmation operation performed by the worker 100, when the fact that the information associated with the ID differs from the information of the worker 100 is input by the worker 100, the flow returns to a position immediately before S100, and re-identification is made.

In S106, the ID of the authenticated worker 100 and attribute information associated with the ID are transmitted to the LUT 11.

When the answer to S102 is No and it is determined that the acquired information has not yet been registered, the flow proceeds to S104, and the ID recognition unit 10 makes an inquiry to the worker 100 through the user interface about the following processes. Details of the processes about which an inquiry is made are re-identification, new registration of information of the worker 100, and doing nothing, and the inquiry is made to the worker 100 through the user interface about which process to select.

When the worker 100 selects a re-identification process, the flow returns to the position immediately before S100, and re-identification is made.

When the worker 100 selects a new registration process, the flow proceeds to S105. In S105, the ID recognition unit 10 issues a new ID and displays, through the user interface, a screen that prompts the worker 100 to input attribute information, such as a dominant hand. Subsequently, the input attribute information is stored in the memory 1006 in association with the ID. When inputting is performed, the user interface displays options of input information, and thus the worker only has to select an option and perform inputting in accordance with an instruction from the user interface. As input information, a personal name, a dominant hand, height, a language to use, the length of experience, and so forth are set when necessary.

When the worker 100 selects a do-nothing process, the flow proceeds to S107, and a standard ID provided for a certain worker and attribute information associated with the standard ID are transmitted to the LUT 11.

After that, the control flow regarding acquisition of identifying information of the worker 100, new registration of attribute information, and personal authentication ends.

Figure 5A:
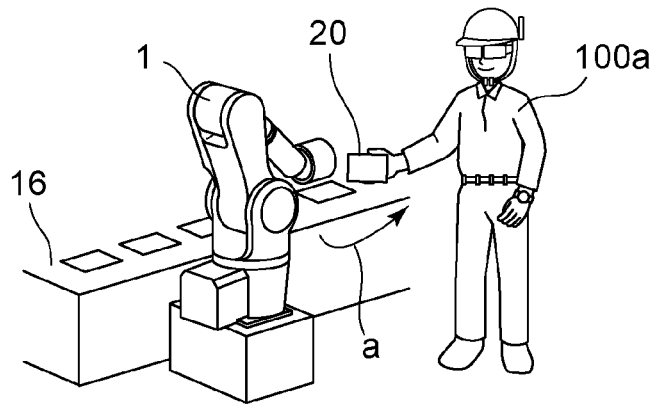
FIGS. 5A to 5C each illustrate an action of a robot body based on an attribute of a worker in the embodiment.
Figure 5B:
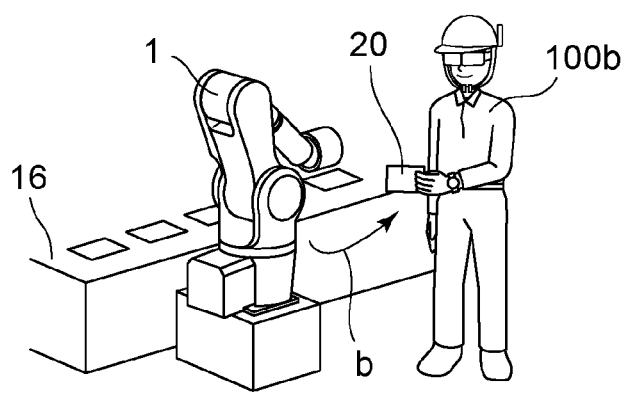
Figure 5C:
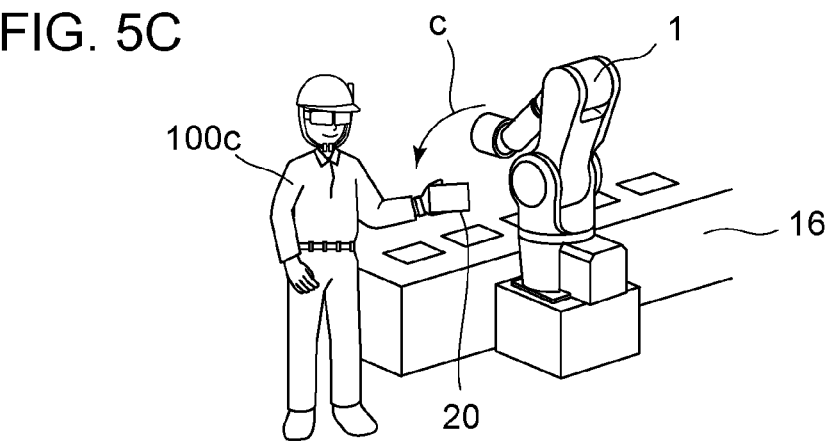

FIGS. 5A to 5C each illustrate an example of an action of the robot body 1 in collaborative work between the robot body 1 and the worker 100, and the action has been registered in the LUT 11 in association with an ID. FIGS. 5A to 5C each illustrate work in which the robot body 1 takes a fully assembled workpiece 20 from a workbench 16 and transfers the workpiece 20 to the worker 100, the worker 100 examines the received workpiece 20 and transfers the workpiece 20 to the robot body 1, and the robot body 1 puts the workpiece 20 back on the workbench 16.

FIG. 5A illustrates the case where, when a worker 100a is right-handed and performs work of transfer (or receipt), the worker 100a is present on the right side of the plane of the drawing with respect to the robot body 1. FIG. 5B illustrates the case where, when a worker 100b is left-handed and performs work of transfer (or receipt), the worker 100b is present on the right side of the plane of the drawing with respect to the robot body 1. FIG. 5C illustrates the case where, when a worker 100c is left-handed and performs work of transfer (or receipt), the worker 100c is present on the left side of the plane of the drawing with respect to the robot body 1.

Here, the standard ID described in FIG. 4 will be described in detail. The standard ID is an ID associated with a template action predetermined in the robot body 1 in work performed by the robot body 1 and a worker in collaboration with each other. In each of FIGS. 5A and 5B, as the template action, an action of transfer to (or receipt from) the worker in the case where the worker is present on the right side of the plane of the drawing with respect to the robot body 1 (in the case where the right hand of the worker is on a workbench side) has been registered in the LUT 11 in association with the standard ID. In FIG. 5A, the end effector is caused to operate in the direction of an arrow a. In FIG. 5B, the end effector is caused to operate in the direction of an arrow b.

In the case of FIG. 5A, the worker 100a is right-handed, and thus when the template action based on the standard ID is performed, the dominant hand (right hand) is on the workbench side when the robot body 1 and the worker 100a face each other, therefore enabling a series of actions to be performed smoothly.

On the other hand, in the case of FIG. 5B, the worker 100b is left-handed, and thus when the template action based on the standard ID is performed, the dominant hand (left hand) is on a side opposite to the workbench when the robot body 1 and the worker 100b face each other. Consequently, the movement of the dominant hand of the worker 100b is increased, and a working speed decreases. Furthermore, repetitive work causes increased fatigue. To avoid this, work has to be performed with the right hand that is non-dominant. However, mastery is necessary to increase the working speed, and mistakes may also be caused.

Thus, when the worker is left-handed as illustrated in FIG. 5C, the robot body 1 is caused to operate in accordance with not the template action registered for the standard ID but an action registered for an ID having an attribute of being left-handed. In FIG. 5C, the end effector is caused to operate in the direction of an arrow c. When work is performed in FIG. 5C, an action of transfer to (or receipt from) the worker in the case where the worker is present on the left side of the plane of the drawing with respect to the robot body 1 (in the case where the left hand of the worker is on the workbench side) has been registered in the LUT 11 in association with the ID having the attribute of being left-handed.

Thus, the dominant hand of the worker 100c is on the workbench side, and the movement of the dominant hand is small in comparison with the case where work is performed in accordance with the template action associated with the standard ID. Hence, the working speed can be increased, and a fatigue level in the case where repetitive work is performed can also be reduced.

As described above, in actions performed by the robot body 1 in the work, such as transfer (or receipt) described above, the action associated with the standard ID and the action associated with the ID having the attribute of being left-handed have been registered in the LUT 11. In this embodiment, although work of transfer (or receipt) has been described as an example for simplification of explanation, in any other work, for example, fastening of screws or transfer of large workpieces as well, actions corresponding to individual IDs have been registered.

In this embodiment, although, assuming the case where there are many right-handed workers, an action for which a right-handed worker as the standard ID easily works has been registered as the template action, the action is not limited to this. In the case where there are many left-handed workers, as the template action, an action for which a left-handed worker easily works can be associated with the standard ID.

Figure 6:
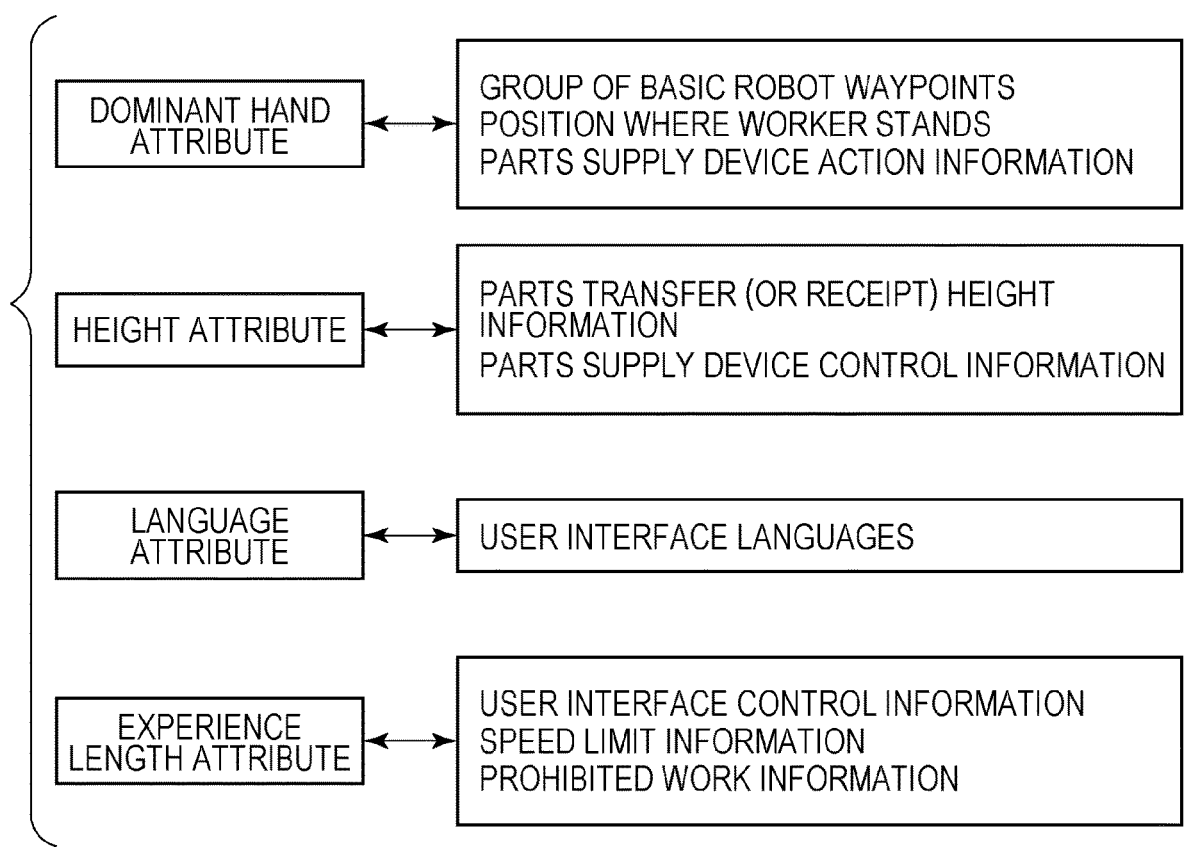
FIG. 6 illustrates attributes of the worker and pieces of information corresponding to the attributes in the embodiment.

FIG. 6 illustrates the types of pieces of attribute information of the worker 100 associated with an ID and specific pieces of data registered correspondingly in the LUT 11 in association with the pieces of attribute information. In this embodiment, as pieces of attribute information (special information), a dominant hand attribute, a height attribute, a language attribute, and an experience length attribute are set.

As specific data associated with the dominant hand attribute, there have been registered a group of basic waypoints of the robot body 1 during work described in FIGS. 5A to 5C, a position where the worker stands, and action information of the parts supply device.

As specific data associated with the height attribute, there have been registered parts transfer (or receipt) height information and control information of the parts supply device that would result in work most naturally performed by the worker.

As specific data associated with the language attribute, there is language information to be displayed as characters on the user interface. For example, official languages of various countries, such as Japanese, English, Chinese, and German, have been registered in association with the language attribute.

As specific data associated with the experience length attribute, there have been registered user interface control information, such as help information, working speed limit information, prohibited work information based on the length of experience, and so forth.

Thus, various pieces of information corresponding to attributes associated with an ID have been registered in the LUT 11. The LUT 11 extracts, by using an ID transmitted from the ID recognition unit 10 and attribute information associated with the ID, corresponding action information and control information and transmits these pieces of information to the action adjustment unit 12.

Figure 7:
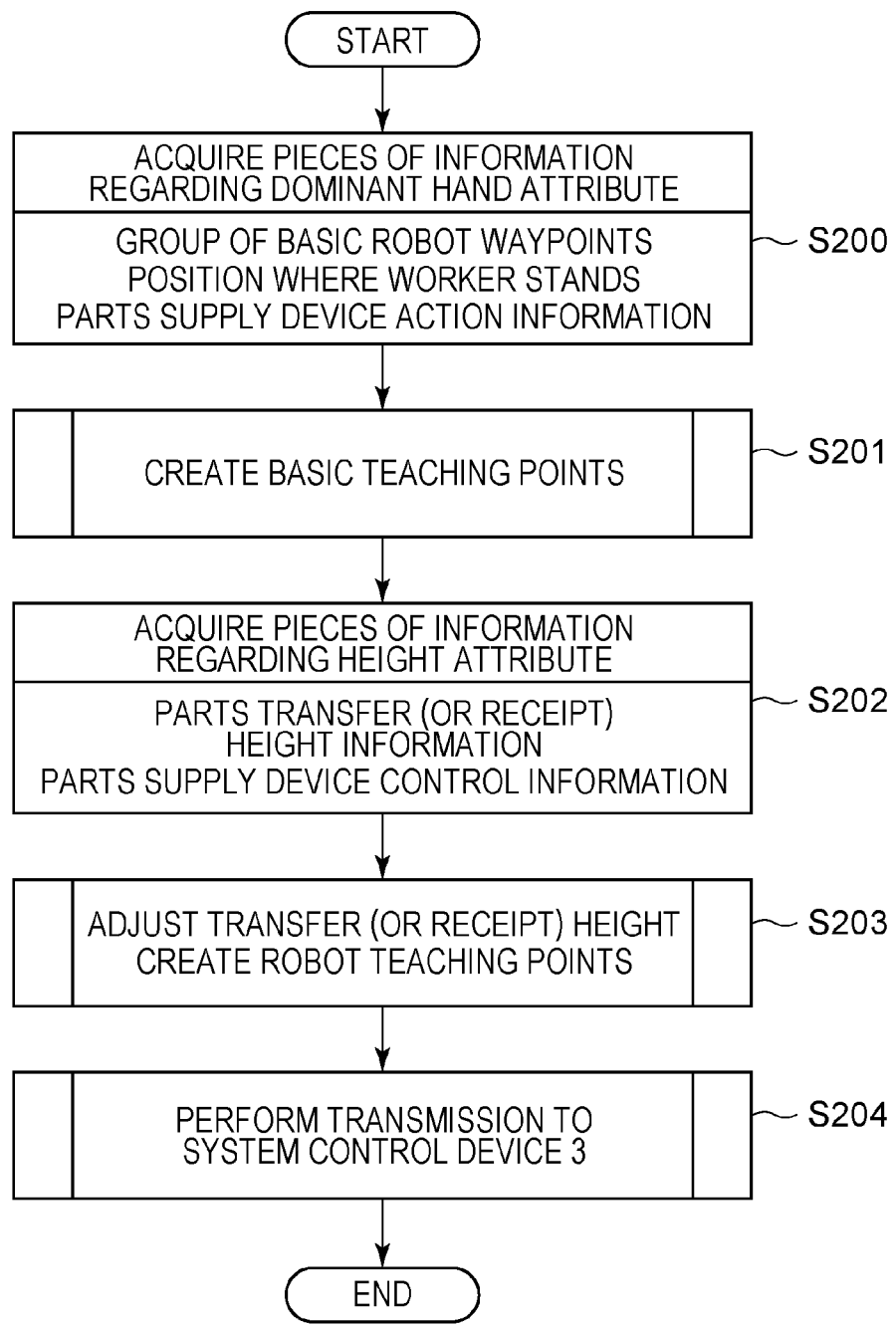
FIG. 7 is a control flowchart in the embodiment.

FIG. 7 is a flowchart illustrating a control flow performed by the action adjustment unit 12 by using action information and control information transmitted from the LUT 11. On this occasion, for simplification of explanation, a process of creating teaching points of the robot body 1 by using action information and control information corresponding to the dominant hand attribute and the height attribute will be described in detail.

First, in S200, pieces of information regarding the dominant hand attribute transmitted from the LUT 11 are acquired.

Next, in S201, basic teaching points for an action to be performed by the robot body 1 are created by using the pieces of information regarding the dominant hand attribute acquired in S200. For example, in the case of a worker having an attribute of being right-handed, teaching points for causing the robot body 1 to operate as described with reference to FIG. 5A are created. In the case of a worker having an attribute of being left-handed, teaching points for causing the robot body 1 to operate as described with reference to FIG. 5C are created.

Next, in S202, pieces of information regarding the height attribute transmitted from the LUT 11 are acquired.

Next, in S203, the height of a parts transfer (or receipt) position is adjusted by using the pieces of information regarding the height attribute and the basic teaching points created in S201, and final robot teaching points are created. Specifically, teaching points reflecting adjustments made to the position of the end effector in transfer (or receipt) performed by the robot body 1 are created. Furthermore, if the parts supply device 16 includes a tilt mechanism, the positioning of the tilt mechanism is simultaneously adjusted.

Next, in S204, the created robot teaching points and parts supply device teaching points are transmitted to the system control device 3. The system control device 3 performs, by using the transmitted robot teaching points and parts supply device teaching points, timing control on these two devices and other peripheral devices. The robot teaching points are transferred to the dedicated robot control device 2, and the robot body 1 is driven in accordance with the timing at which the robot control device 2 performs control. In this embodiment, although the parts supply device teaching points are used by the system control device 3 to control the parts supply device 16, a control device may be separately provided in the parts supply device 16 to thus perform control.

Furthermore, as described above, teaching points for controlling actions of the robot body 1 are created by using the pieces of information corresponding to the dominant hand attribute and the height attribute. Of course, languages to be displayed on a monitor or languages whose sounds are to be produced by voice can be set by using pieces of information corresponding to the language attribute to give the worker 100 a warning or guidance. Furthermore, the operation speed of the robot body 1 can be limited or prohibited work can be set by using pieces of information corresponding to the experience length attribute.

Consequently, when collaborative work is performed, the robot body can be caused to operate in consideration of attributes of a worker, thereby enabling an improvement in work efficiency. This causes a machine to operate in response to a human and can keep the efficiency from decreasing. In particular, actions can be changed in accordance with the dominant hand, thus enabling not only an improvement in work efficiency but also a reduction in worker fatigue.

Second Embodiment

In the first embodiment described above, the form has been described in which teaching points of the robot body 1 are created by using the dominant hand attribute and the height attribute of the worker. In this embodiment, a case will be described in detail where a process of providing a display on the head mounted display 13 is controlled by using the language attribute of the worker. In the following description, constituent parts of hardware or the control system different from those in the first embodiment are illustrated and described. Furthermore, parts similar to those in the first embodiment can achieve configurations and functions similar to the above, and thus a detailed description thereof is omitted.

Figure 8:
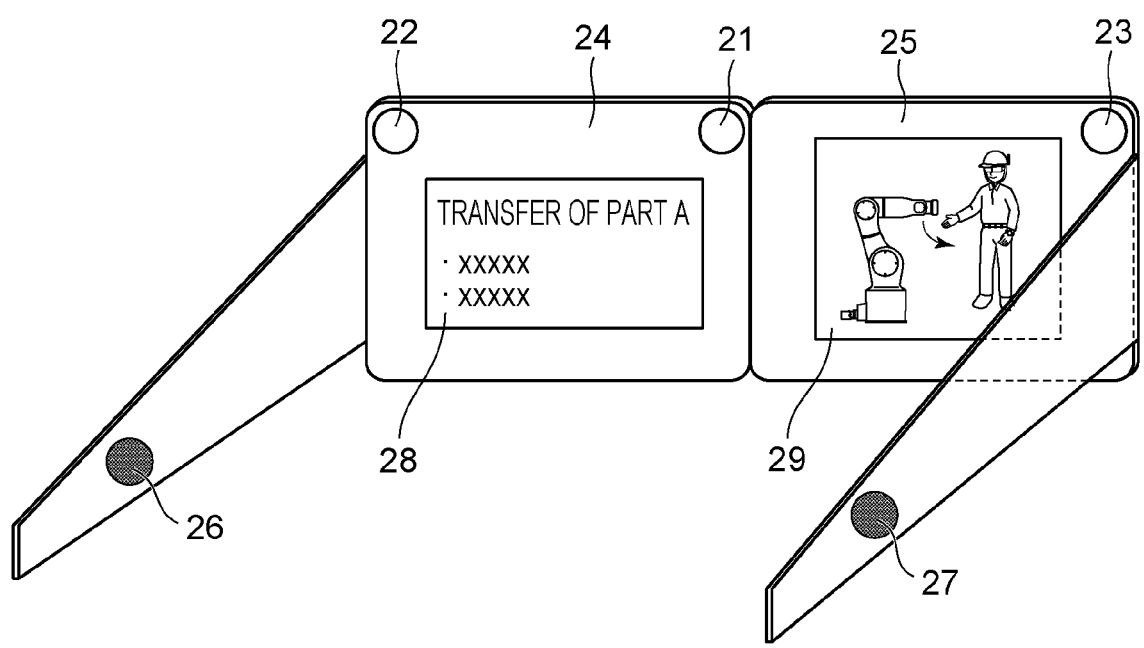
FIG. 8 is a schematic diagram of a head mounted display in an embodiment.

FIG. 8 illustrates the head mounted display 13 in this embodiment. First, the head mounted display 13 is a glasses-style wearable display and includes an image sensor 21, stereo cameras 22 and 23, display portions 24 and 25, and speakers 26 and 27. Furthermore, the head mounted display 13 is configured to be able to wirelessly communicate with the user interface control device 4 and includes a processing unit that controls each camera, each display portion, and each speaker. Thus, the processing unit can make an exchange of pieces of attribute information, IDs, and so forth of workers from the LUT 11 with the user interface control device 4.

The image sensor 21 is an image sensor for identifying a worker wearing the head mounted display 13. The image sensor 21 acquires an image of an iris, a face, or the like and transfers the acquired image to the ID recognition unit 10 via the user interface control device 4.

The stereo cameras 22 and 23 are outward-facing stereo cameras. The stereo cameras 22 and 23 acquire three-dimensional information of the robot body 1 and peripheral devices the worker wearing the head mounted display 13 is seeing.

The display portions 24 and 25 are semitransparent and can display pieces of work information 28 and 29 without obstructing the worker's view.

The speakers 26 and 27 are provided in temple portions of the head mounted display 13 and output navigation information, warning information, or the like by voice near the worker's ears.

The work information 28 refers to a navigation display area indicating details of, for example, a task that is being performed and a subsequent task that is to be performed. The work information 28 is displayed on the display portion 24 as text information. This information is displayed in a worker's native language in accordance with information corresponding to the language attribute associated with a worker ID acquired by using the LUT 11. In FIG. 8, although transfer of a part A is displayed as work information, receipt of the part A can be displayed as work information.

The work information 29 refers to a navigation display area indicating, as a trajectory, action details of, for example, a task that is being performed and a subsequent task that is to be performed. The work information 29 is displayed on the display portion 25. An action trajectory of the robot body 1 based on teaching points created in accordance with pieces of information corresponding to the dominant hand and height attributes associated with the worker ID acquired by using the LUT 11 is displayed using a highlighted arrow. On this occasion, a target position when the robot body 1 approaches the worker is also displayed. Furthermore, an action of the robot body 1 in the case of a worker whose dominant hand is the right hand may be displayed as a standard action.

Incidentally, the work information 29 can also be implemented by overwriting action details over an actual image. In this case, action details are generated by using pieces of three-dimensional information acquired by the vision sensor 5 and the stereo cameras 22 and 23 and are overwritten.

Furthermore, the speakers 26 and 27 output navigation information, warning information, or the like in work details by voice in the worker's native language in accordance with the information corresponding to the language attribute associated with the worker ID acquired by using the LUT 11.

Consequently, in this embodiment, when work details are displayed and are output by voice, a display and a voice output are provided in the native language of the worker who is performing work. Thus, the worker can be informed of work details or cautions during work with certainty, enabling a reduction in work mistakes, for example. Incidentally, in a certain robot system, a combination of this embodiment and a modification with the above-described first embodiment and a modification can be implemented.

Third Embodiment

In the second embodiment described above, the case has been described in detail where the process of providing a display on the head mounted display 13 is controlled by using attribute information of the worker. In this embodiment, a case will be described in detail where a process of providing a display on the helmet 14 is controlled by using the language attribute of the worker. In the following description, constituent parts of the hardware or the control system different from those in the above-described embodiments are illustrated and described. Furthermore, parts similar to those in the above-described embodiments can achieve configurations and functions similar to the above, and thus a detailed description thereof is omitted.

Figure 9:
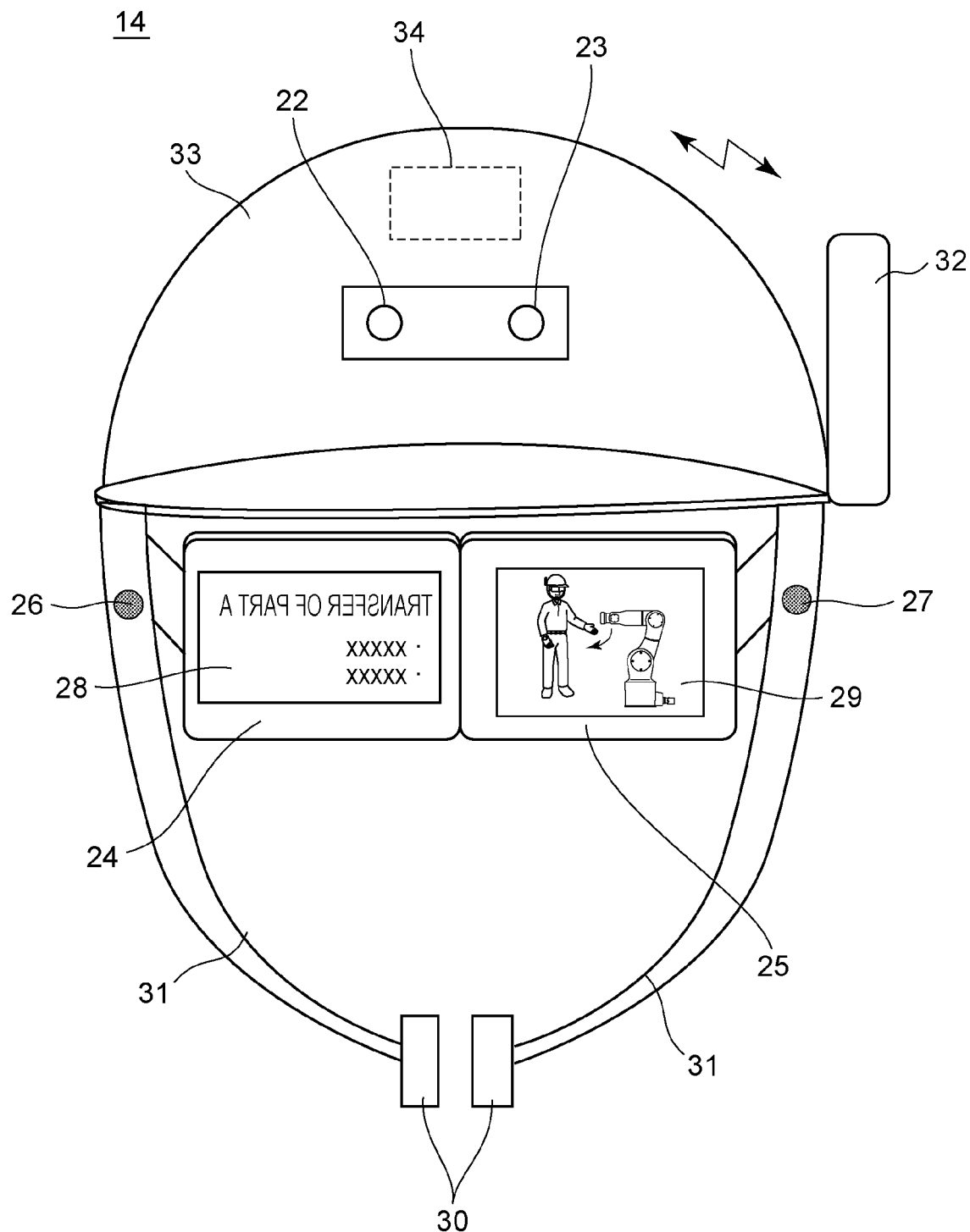
FIG. 9 is a schematic diagram of a helmet in an embodiment.

FIG. 9 illustrates the helmet 14 in this embodiment. First, the helmet 14 includes a buckle 30, a belt 31, a wireless communication unit 32, an overhead portion 33, and a processing unit 34. Furthermore, the helmet 14 includes the stereo cameras 22 and 23, the display portions 24 and 25, and the speakers 26 and 27.

The buckle 30 is a fastener for keeping the helmet 14 from slipping out of the worker. Furthermore, the belt 31 includes therein a communication line capable of communicating with the processing unit 34 and has a function of being able to perform transmission and reception of data. Furthermore, the buckle 30 includes therein a pressure-sensitive sensor (not illustrated). The buckle 30 transmits data of the pressure-sensitive sensor to the processing unit 34 by using the belt 31, and a determination is made as to whether or not the buckle 30 has been fastened.

The speakers 26 and 27 are provided in the belt 31 and output navigation information, warning information, or the like by voice near the worker's ears in accordance with an instruction given by the processing unit 34.

The stereo cameras 22 and 23 are outward-facing stereo cameras. The stereo cameras 22 and 23 acquire three-dimensional information of the robot body 1 and the peripheral devices the worker wearing the helmet 14 is seeing and transmit the information to the processing unit 34.

The display portions 24 and 25 are semitransparent and can display the pieces of work information 28 and 29 without obstructing the worker's view. The display portions 24 and 25 are provided in such a manner as to be able to communicate with the processing unit 34.

The wireless communication unit 32 is a communication unit that enables wireless communication between the user interface control device 4 and the processing unit 34. For example, Wi-Fi communication, Bluetooth communication, or the like is used. This enables the processing unit 34 to transmit the condition of the buckle 30 to the system control device 3 via the user interface control device 4 and to receive pieces of work information from the system control device 3 via the user interface control device 4. Thus, the processing unit 34 can make an exchange of pieces of attribute information, IDs, and so forth of workers from the LUT 11 with the user interface control device 4.

The work information 28 refers to a navigation display area indicating details of, for example, a task that is being performed and a subsequent task that is to be performed. The work information 28 is displayed on the display portion 24 as text information. This information is displayed in a worker's native language in accordance with information corresponding to the language attribute associated with a worker ID acquired by using the LUT 11. In FIG. 9, although transfer of the part A is displayed as work information, receipt of the part A can be displayed as work information.

The work information 29 refers to a navigation display area indicating, as a trajectory, action details of, for example, a task that is being performed and a subsequent task that is to be performed. The work information 29 is displayed on the display portion 25. An action trajectory of the robot body 1 based on teaching points created in accordance with pieces of information corresponding to the dominant hand and height attributes associated with the worker ID acquired by using the LUT 11 is displayed using a highlighted arrow. On this occasion, a target position when the robot body 1 approaches the worker is also displayed. Furthermore, an action of the robot body 1 in the case of a worker whose dominant hand is the right hand may be displayed as a standard action.

Incidentally, the work information 29 can also be implemented by overwriting action details over an actual image. In this case, action details are generated by using pieces of three-dimensional information acquired by the vision sensor 5 and the stereo cameras 22 and 23 and are overwritten.

Furthermore, the speakers 26 and 27 output navigation information, warning information, or the like in work details by voice in the worker's native language in accordance with the information corresponding to the language attribute associated with the worker ID acquired by using the LUT 11.

Furthermore, when the buckle 30 has been unfastened, the processing unit 34 transmits, to the system control device 3, information that the buckle 30 has been unfastened. The system control device 3 having received the information that the buckle 30 has been unfastened causes the safety device 7 to operate and brings the robot body 1 to a stop to ensure the safety of the worker. Furthermore, the processing unit 34 provides, via the display portions 24 and 25 or the speakers 26 and 27, a notification that the buckle 30 is to be fastened in the worker's native language. In this embodiment, although the safety device 7 is caused to operate in accordance with the buckle 30, the safety device 7 can be caused to operate in accordance with detection of abnormalities in the worker based on brain waves.

Consequently, in this embodiment, when work details are displayed and are output by voice, a display and a voice output are provided in the native language of the worker who is performing work. Thus, the worker can be informed of work details or cautions during work with certainty, enabling a reduction in work mistakes, for example.

Furthermore, when equipment, such as a helmet, that protects the worker is not worn correctly, the safety device is caused to operate, the robot body is brought to a stop, and the worker is notified that the equipment is to be worn more correctly. Thus, worker safety can be maintained with certainty. Safety is ensured, thereby enabling the worker to smoothly perform work with a sense of safety and enabling an improvement in work efficiency.

In this embodiment, although the helmet 14 is caused to work in conjunction with the safety device 7, a user interface that is caused to work in conjunction with the safety device 7 is not limited to this. For example, the head mounted display 13 or the wristwatch terminal 15 can be caused to work. When the head mounted display 13 is caused to work, information, such as sweating, is acquired from worker's facial expression information by using the image sensor 21. When a certain amount of sweating is found, the safety device 7 is caused to operate in accordance with occurrence of abnormalities in the worker. When the wristwatch terminal 15 is caused to work, information, such as heart rate, is acquired from blood flow pattern information. When a certain number of heartbeats is found, the safety device 7 is caused to operate in accordance with occurrence of abnormalities in the worker. Incidentally, in a certain robot system, a combination of this embodiment and a modification with the above-described first embodiment and a modification can be implemented.

Fourth Embodiment

In the third embodiment described above, the case has been described in detail where the process of providing a display on the helmet 14 is controlled by using attribute information of the worker. In this embodiment, a case will be described in detail where a process of providing a display on the wristwatch terminal 15 is controlled by using the language attribute of the worker. In the following description, constituent parts of the hardware or the control system different from those in the above-described embodiments are illustrated and described. Furthermore, parts similar to those in the above-described embodiments can achieve configurations and functions similar to the above, and thus a detailed description thereof is omitted.

Figure 10A:
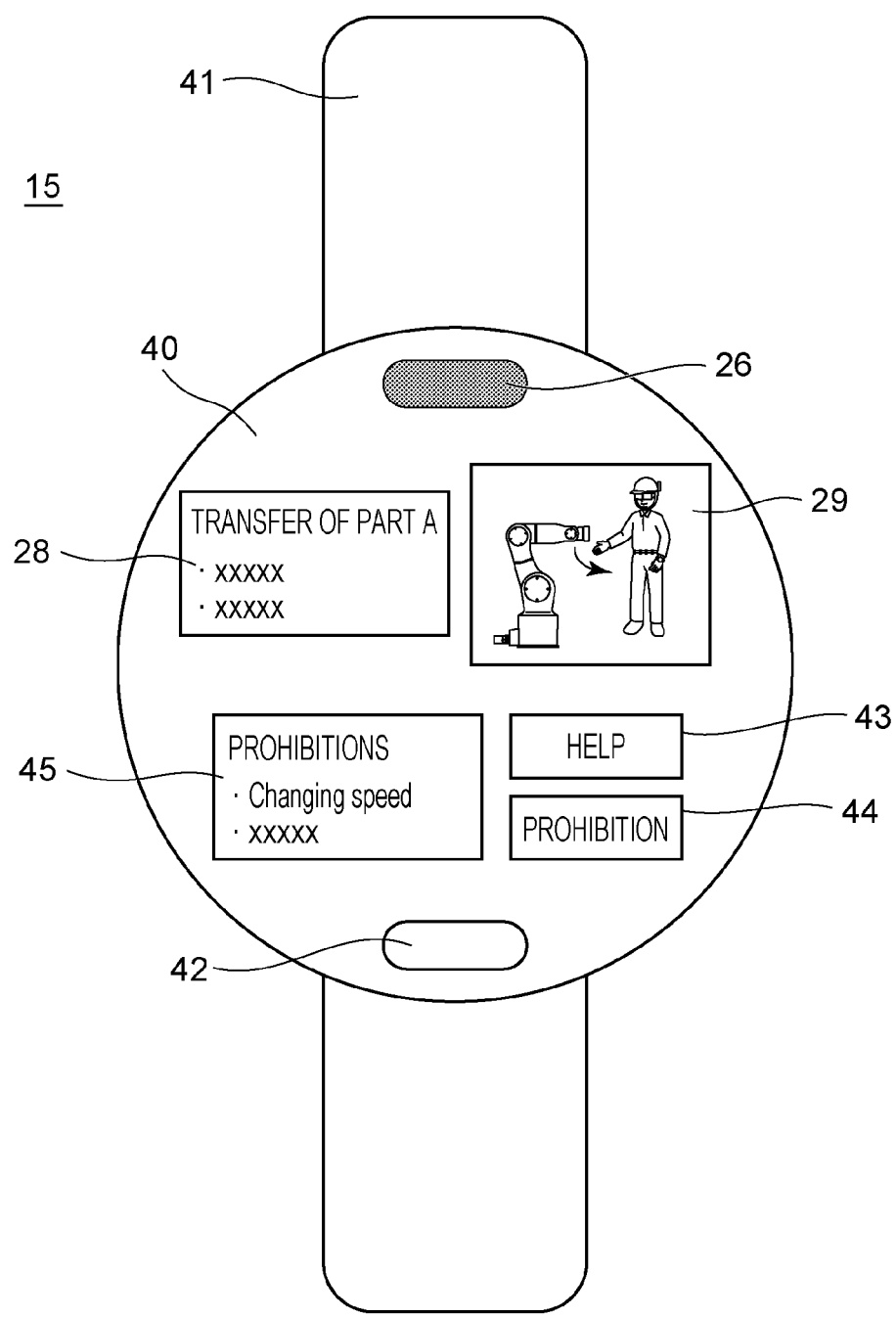
FIGS. 10A and 10B are each a schematic diagram of a wristwatch terminal in an embodiment.
Figure 10B:
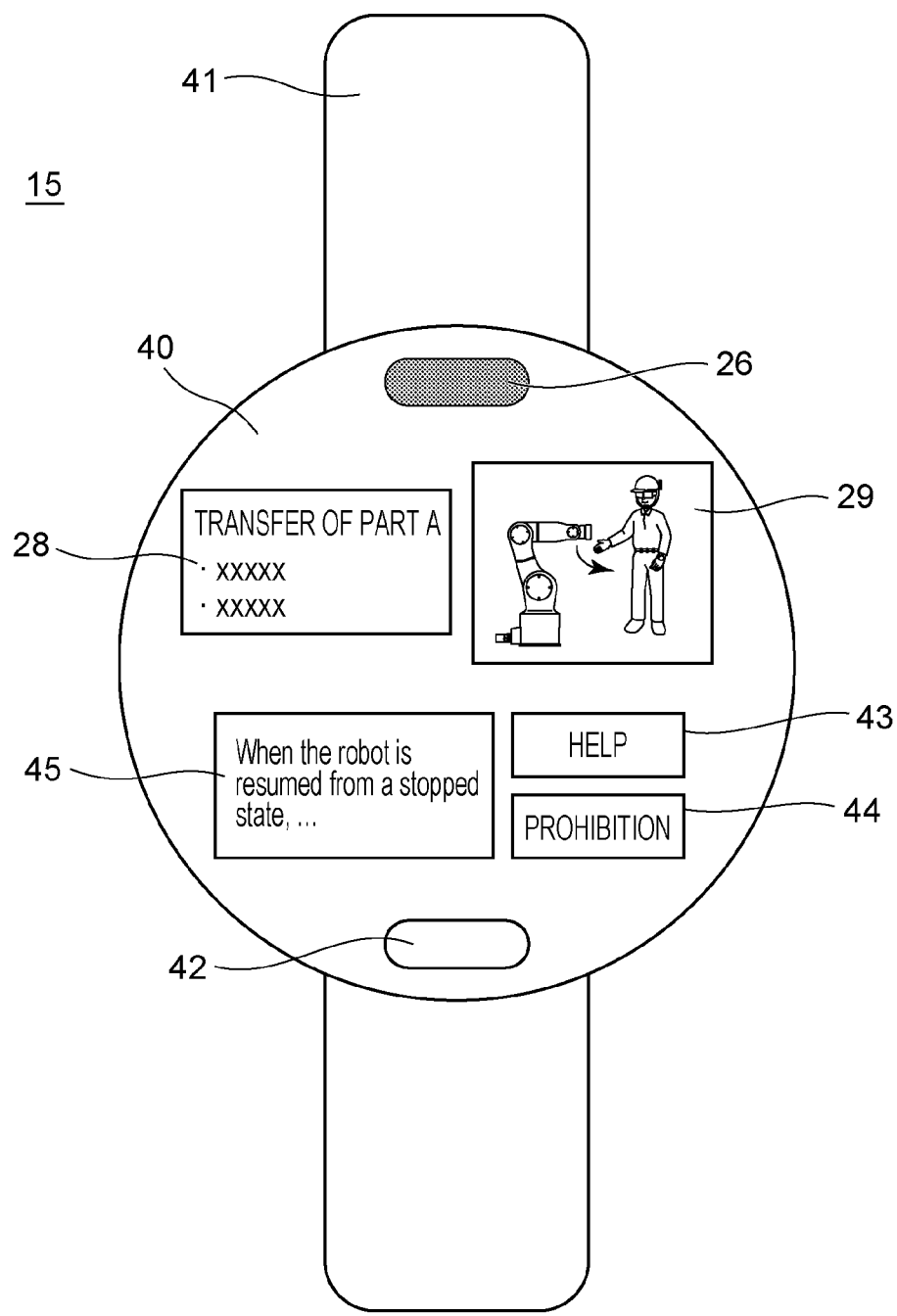

FIGS. 10A and 10B each illustrate the wristwatch terminal 15 in this embodiment. FIG. 10A is a diagram in which prohibitions are displayed to the worker. FIG. 10B is a diagram in which help information is displayed to the worker. The wristwatch terminal 15 includes a touch panel 40 and a belt 41. Furthermore, in the touch panel 40, the speaker 26 and a fingerprint authentication unit 42 are provided. Furthermore, the wristwatch terminal 15 is configured to be able to wirelessly communicate with the user interface control device 4 and includes a processing unit that controls the touch panel 40, the speaker 26, and the fingerprint authentication unit 42. Thus, the processing unit can make an exchange of pieces of attribute information, IDs, and so forth of workers from the LUT 11 with the user interface control device 4.

The speaker 26 outputs navigation information, warning information, or the like by voice to the worker in accordance with an instruction given by the processing unit.

When the worker touches the fingerprint authentication unit 42 with a finger in a certain time period, the fingerprint authentication unit 42 acquires fingerprint information of the finger and transmits the information to the processing unit.

The touch panel 40 can display the pieces of work information 28 and 29, a help button 43, a prohibitions display button 44, and an experience length information display portion 45. The touch panel 40 is provided in such a manner as to be able to communicate with the processing unit.

The work information 28 refers to a navigation display area indicating details of, for example, a task that is being performed and a subsequent task that is to be performed. The work information 28 is displayed on the touch panel 40 as text information. This information is displayed in a worker's native language in accordance with information corresponding to the language attribute associated with a worker ID acquired by using the LUT 11. In FIGS. 10A and 10B, although transfer of the part A is displayed as work information, receipt of the part A can be displayed as work information.

The work information 29 refers to a navigation display area indicating, as a trajectory, action details of, for example, a task that is being performed and a subsequent task that is to be performed. The work information 29 is displayed on the touch panel 40. An action trajectory of the robot body 1 based on teaching points created in accordance with pieces of information corresponding to the dominant hand and height attributes associated with the worker ID acquired by using the LUT 11 is displayed using a highlighted arrow. On this occasion, a target position when the robot body 1 approaches the worker is also displayed. Furthermore, an action of the robot body 1 in the case of a worker whose dominant hand is the right hand may be displayed as a standard action.

Incidentally, the work information 29 can also be implemented by overwriting action details over an actual image. In this case, action details are generated by using an image acquired by the vision sensor 5 and are overwritten.

Furthermore, the speaker 26 outputs navigation information, warning information, or the like in work details by voice in the worker's native language in accordance with the information corresponding to the language attribute associated with the worker ID acquired by using the LUT 11.

Furthermore, details based on the length of experience are displayed in the worker's native language on the experience length information display portion 45. When the prohibitions display button 44 is touched, prohibitions based on information about the length of experience of the worker who is working are displayed as illustrated in FIG. 10A. When the help button 43 is pressed, help information based on the information about the length of experience of the worker who is working is displayed as illustrated in FIG. 10B. Furthermore, for the experience length information display portion 45, a scrolling operation with a touch is possible.

FIG. 10A illustrates what is seen when a worker whose length of experience is not longer than a certain length of time touches the prohibitions display button 44. The worker whose length of experience is not longer than the certain length of time is not very good at handling the robot body 1 and thus is prohibited from changing basic settings of the robot body 1, such as changing the speed of the robot body 1, in consideration of safety. In the case of a worker whose length of experience is longer than the certain length of time, a matter of changing speed is kept from being displayed.

FIG. 10B illustrates what is seen when the worker whose length of experience is longer than the certain length of time touches the help button 43. Assume that the robot body 1 comes to a stop during work and the help button 43 is touched when the robot body 1 is resumed. The worker whose length of experience is longer than the certain length of time is good at handling the robot body 1 to a certain degree, and thus a method of resuming the robot body 1 is displayed on the experience length information display portion 45. In the case where a display is provided to the worker whose length of experience is not longer than the certain length of time, a notification is provided that the worker whose length of experience is longer than the certain length of time is to be caused to perform the method of resumption, such as "Ask a veteran worker near you to perform". Incidentally, notifications about prohibitions and help information can be provided by voice through the speaker 26.

Consequently, in this embodiment, when work details are displayed and are output by voice, a display and a voice output are provided in the native language of the worker who is performing work. Thus, the worker can be informed of work details or cautions during work with certainty, enabling a reduction in work mistakes, for example.

Furthermore, a display of prohibitions or a display of help information is changed according to the length of experience of the worker. This can keep a worker who is not good at handling the robot body from performing an action that is not easy to manipulate in the robot body (an action that endangers the worker through some manipulations) and can ensure the safety of the worker. Safety is ensured, thereby enabling the worker to smoothly perform work with a sense of safety and enabling an improvement in work efficiency.

In this embodiment, although prohibitions or help information based on the length of experience is displayed on the wristwatch terminal 15, a user interface on which a display is provided is not limited to this. For example, a display can be provided on the head mounted display 13, the helmet 14, a teaching pendant, or the like. Incidentally, in a certain robot system, a combination of this embodiment and a modification with the above-described first embodiment and a modification can be implemented.

Fifth Embodiment

In the fourth embodiment described above, the case has been described in detail where the process of providing a display on the wristwatch terminal 15 is controlled by using attribute information of the worker. In this embodiment, a case will be described in detail where a process of providing a display on a teaching pendant through which the robot body 1 is operated is controlled by using the language attribute of the worker. In the following description, constituent parts of the hardware or the control system different from those in the above-described embodiments are illustrated and described. Furthermore, parts similar to those in the above-described embodiments can achieve configurations and functions similar to the above, and thus a detailed description thereof is omitted.

Figure 11:
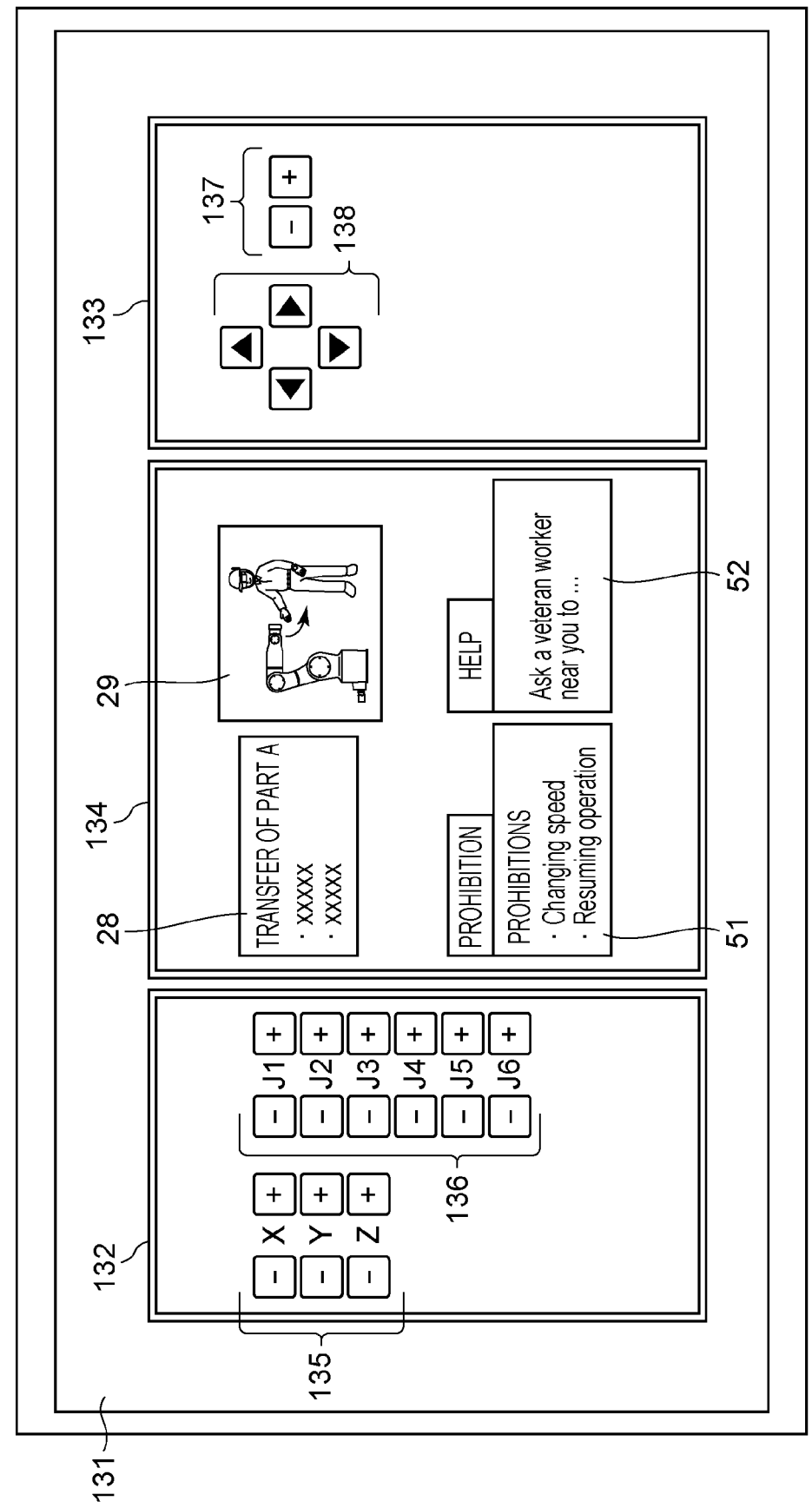
FIG. 11 is a schematic diagram of a teaching pendant in an embodiment.

FIG. 11 illustrates a teaching pendant 130 for a teaching person operating the robot body 1 and the vision sensor 5.

The teaching pendant 130 includes a display portion 131. In this embodiment, as an example of a teaching pendant, a teaching tablet will be described. In this embodiment, although a teaching tablet is described as an example, a tablet terminal, such as a smartphone, can be used. The teaching pendant 130 is configured to be able to wirelessly communicate with the user interface control device 4 and includes a processing unit that controls the display portion 131. Thus, the processing unit can make an exchange of pieces of attribute information, IDs, and so forth of workers from the LUT 11 with the user interface control device 4. Furthermore, the vision sensor 5 is a camera having a pan-tilt-zoom function.

An interface for operating the robot body 1 and the vision sensor 5, work information, and so forth are displayed on the display portion 131. The display portion 131 is a display corresponding to a touch panel. The worker can input a command value to the robot body 1 and the vision sensor 5 by operating the display portion 131 with a touch or the like. Consequently, the worker inputs a command value by performing a touch operation on the display portion 131 in accordance with information displayed on the display portion 131 and can operate the robot body 1 and the vision sensor 5.

Furthermore, all of a robot operation unit 132, an image capturing manipulation unit 133, and an information display portion 134 are displayed on the same display portion 131 so that inputs from the worker can be received.

The robot operation unit 132 includes an end effector operation button 135 for moving the end effector of the robot body 1 in X-Y-Z directions in a certain coordinate system and a joint operation button 136 for manipulating the amount of rotation for each of the joints J1 to J6. The image capturing manipulation unit 133 includes a viewpoint manipulation button 138 for performing a pan-tilt operation on the vision sensor 5 and a zoom operation button 137 for performing a zoom in/zoom out operation.

Additionally, the information display portion 134 that displays pieces of information, such as the pieces of work information 28 and 29, a prohibitions display portion 51, and a help information display portion 52, is displayed between the robot operation unit 132 and the image capturing manipulation unit 133. Furthermore, for the prohibitions display portion 51 and the help information display portion 52, a scrolling operation with a touch is possible.

The work information 28 refers to a navigation display area indicating details of, for example, a task that is being performed and a subsequent task that is to be performed. The work information 28 is displayed on the information display portion 134 as text information. This information is displayed in a worker's native language in accordance with information corresponding to the language attribute associated with a worker ID acquired by using the LUT 11. In FIG. 11, although transfer of the part A is displayed as work information, receipt of the part A can be displayed as work information.

The work information 29 refers to a navigation display area indicating, as a trajectory, action details of, for example, a task that is being performed and a subsequent task that is to be performed. The work information 29 is displayed on the information display portion 134. An action trajectory of the robot body 1 based on teaching points created in accordance with pieces of information corresponding to the dominant hand and height attributes associated with the worker ID acquired by using the LUT 11 is displayed using a highlighted arrow. On this occasion, a target position when the robot body 1 approaches the worker is also displayed.

Furthermore, an action of the robot body 1 in the case of a worker whose dominant hand is the right hand may be displayed as a standard action.

Incidentally, the work information 29 can also be implemented by overwriting action details over an actual image. In this case, action details are generated by using an image acquired by the vision sensor 5 and are overwritten.

Furthermore, details based on the length of experience are displayed in the worker's native language on the prohibitions display portion 51 and the help information display portion 52. On the prohibitions display portion 51, prohibitions based on information about the length of experience of the worker who is working are displayed. On the help information display portion 52, help information based on the information about the length of experience of the worker who is working is displayed.

The prohibitions display portion 51 in FIG. 11 is an example of a display provided when the worker whose length of experience is not longer than the certain length of time is performing work. The worker whose length of experience is not longer than the certain length of time is not very good at handling the robot body 1 and thus is prohibited from changing basic settings of the robot body 1 or resuming operation of the robot body 1, such as changing the speed of or resuming the operation of the robot body 1, in consideration of safety. In the case of the worker whose length of experience is longer than the certain length of time, matters of changing speed and resuming operation are kept from being displayed.

The help information display portion 52 in FIG. 11 is an example of a display provided when the worker whose length of experience is not longer than the certain length of time is performing work. Assume that the robot body 1 comes to a stop during work and help information provided when the robot body 1 is resumed is displayed. The worker whose length of experience is not longer than the certain length of time is not very good at handling the robot body 1, and thus a notification is provided that the worker whose length of experience is longer than the certain length of time is to be caused to perform resumption, such as "Ask a veteran worker near you to perform", in consideration of safety. In the case where a display is provided to the worker whose length of experience is longer than the certain length of time, a notification is provided that a specific method of resuming operation, such as "When the robot is resumed from a stopped state, the xxx switch . . . ", is to be performed.

Consequently, in this embodiment, when work details are displayed and are output by voice, a display and a voice output are provided in the native language of the worker who is performing work. Thus, the worker can be informed of work details or cautions during work with certainty, enabling a reduction in work mistakes, for example.

Furthermore, a display of prohibitions or a display of help information is changed according to the length of experience of the worker. This can keep a worker who is not good at handling the robot body from performing an action that is not easy to manipulate in the robot body (an action that endangers the worker through some manipulations) and can ensure the safety of the worker. Safety is ensured, thereby enabling the worker to smoothly perform work with a sense of safety and enabling an improvement in work efficiency. Incidentally, in a certain robot system, a combination of this embodiment and a modification with the above-described first embodiment and a modification can be implemented.

Other Embodiments

Specifically, the processing procedures in the embodiments described above are performed by the control devices.

Hence, when a recording medium recording a program of software capable of executing the above-described functions is supplied to a control device that oversees the control devices and a CPU that performs a process in an integrated manner reads out and executes the program stored in the recording medium, the above-described functions can be achieved. In this case, the program itself read out from the recording medium implements the above-described functions in the embodiments, and the program itself and the recording medium recording the program constitute the present disclosure.

Furthermore, in the embodiments, the case has been described where a computer-readable recording medium is each ROM, each RAM, or each flash ROM and a control program is stored in the ROM, the RAM, or the flash ROM. However, the present disclosure is not to be limited to such a form. The control program for implementing the present disclosure may be recorded in any recording medium that is computer-readable. For example, as a recording medium for supplying the control program, an HDD, an external storage device, a recording disk, or the like may be used.

Furthermore, in the various embodiments described above, although the case has been described where the robot body 1 uses an articulated robot arm having a plurality of joints, the number of joints is not to be limited to this. Although, as the type of the robot arm, a vertical multi-axis configuration has been described, a configuration equivalent to the above can also be implemented in a different type of joint, such as a parallel link type.

Furthermore, the various embodiments described above can be used in a machine in which expansion and contraction, bending and stretching, vertical movement, horizontal movement, circular movement, or a complex of these movements can be automatically performed by using information stored in a storage device provided in a control device.

The present disclosure is not to be limited to the above-described embodiments, and many modifications can be made within the technical concept of the present disclosure. The effects described in the embodiments of the present disclosure are merely the most exemplary effects produced by the present disclosure. The effects produced by the present disclosure are not limited to the effects described in the embodiments of the present disclosure.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-036299 filed Mar. 8, 2021, which is hereby incorporated by reference herein in its entirety.

What is claimed is:

1. A robot system comprising:
a helmet being a terminal operated by a user,
a robot body configured to perform predetermined work together with the user, and a control device configured to control the robot body to
select, in accordance with special information of the user, an action to be performed by the robot body during the predetermined work, and
a safety device configured to stop an action of the robot body safely, and
wherein, when a buckle of the helmet has been unfastened, the safety device operates.

2. The robot system according to claim 1,
wherein the special information includes at least one of dominant hand information of the user, height information of the user, native language information of the user, and information about a length of experience of the user.

3. The robot system according to claim 2,
wherein the control device
causes the robot body to perform a first action when the special information of the user includes information about being right-handed, and
causes the robot body to perform a second action when the special information of the user includes information about being left-handed.

4. The robot system according to claim 3,
wherein the control device
performs, as the first action, an action of causing a particular part of the robot body to approach the user who is located at a position where a right hand of the user is closer to a workbench, and
performs, as the second action, an action of causing the particular part of the robot body to approach the user who is located at a position where a left hand of the user is closer to the workbench.

5. The robot system according to claim 4,
wherein the control device
sets, in accordance with the height information of the user, a target position that the particular part of the robot body approaches the user.

6. The robot system according to claim 3,
wherein the control device
sets, as a standard action of the robot body during the predetermined work, the first action.

7. The robot system according to claim 2,
wherein the control device
sets, in accordance with the native language information of the user, a language for providing a notification to the user.

8. The robot system according to claim 7,
wherein, as the notification, at least one of a notification with characters being displayed on a display portion and a notification by voice is provided.

9. The robot system according to claim 2,
wherein the control device
changes, in accordance with the information about the length of experience of the user, at least one of help information and prohibitions that are displayed to the user.

10. The robot system according to claim 1,
wherein the control device
identifies the user in accordance with at least one piece of information of face information of the user, gait information of the user, iris information of the user, brain wave information of the user, blood flow pattern information of the user, and fingerprint information of the user.

11. The robot system according to claim 10,
wherein the control device
provides, when the special information of the user identified through the identification has not been registered, a notification to the user about at least one of re-identification and new registration of the special information.

12. The robot system according to claim 11,
wherein the control device
performs, when neither the re-identification nor the new registration is selected by the user through the notification, a standard action predetermined in actions to be performed by the robot body during the predetermined work.

13. The robot system according to claim 1,
wherein the robot system further comprises, as another terminal operated by the user, at least one of a head mounted display, a wristwatch terminal, and a teaching pendant.

14. The robot system according to claim 13,
wherein the control device
displays a trajectory of an action to be performed by the robot body during the predetermined work on the another terminal.

15. The robot system according to claim 14,
wherein the another terminal is a head mounted display.

16. The robot system according to claim 13,
wherein the control device
displays details of the predetermined work on the another terminal.

17. A method of manufacturing a product using the robot system according to claim 1.

18. A helmet operated by a user who performs work together with a robot body configured to perform predetermined work,
the helmet comprising a display portion that
displays an action to be performed by the robot body during the predetermined work in accordance with special information of the user;
wherein, when a buckle of the helmet has been unfastened, a safety device configured to stop an action of the robot body safely operates.

19. A control method for a robot system including a helmet operable by a user as a terminal, a robot body configured to perform predetermined work together with the user, and a control device configured to control the robot body, the control method comprising,
with the control device,
selecting, in accordance with special information of the user, an action to be performed by the robot body during the predetermined work,
when a buckle of the helmet has been unfastened, operating a safety device of the robot system that stops an action of the robot body safely.

20. A non-transitory computer-readable recording medium storing a control program capable of executing the control method according to claim 19.

21. A control method for a helmet operated by a user who performs work together with a robot body configured to perform predetermined work, the control method comprising,
with the helmet comprising a display portion,
displaying an action to be performed by the robot body during the predetermined work in accordance with special information of the user
wherein, when a buckle of the helmet has been unfastened, a safety device configured to stop an action of the robot body safely operates.

* * * * *